US006942229B2

(12) United States Patent
Brazell et al.

(10) Patent No.: US 6,942,229 B2
(45) Date of Patent: Sep. 13, 2005

(54) COLLAPSIBLE STAND FOR A BENCH-TOP POWER TOOL

(75) Inventors: Kenneth M. Brazell, Piedmont, SC (US); Peter J. Shigo, Mesa, AZ (US)

(73) Assignee: One World Technologies Limited, Hamilton (BM)

( * ) Notice: Subject to any disclaimer, the term of this patent is extended or adjusted under 35 U.S.C. 154(b) by 0 days.

(21) Appl. No.: 10/698,351

(22) Filed: Oct. 31, 2003

(65) Prior Publication Data

US 2005/0093258 A1 May 5, 2005

(51) Int. Cl.[7] .......... B62B 1/04
(52) U.S. Cl. .......... 280/30; 83/477.2; 83/859; 108/119; 280/641; 280/651
(58) Field of Search .......... 280/30, 641, 645, 280/651, 652, 659, DIG. 6; 83/477.2, 859, 83/701, 574; 451/361, 411; 144/286.1, 286.5; 108/12, 102, 132, 11, 119; 248/150

(56) References Cited

U.S. PATENT DOCUMENTS

| | | | | |
|---|---|---|---|---|
| 1,807,916 A | | 6/1931 | Jones | |
| 1,895,290 A | * | 1/1933 | Lobel | 108/120 |
| 1,978,650 A | | 10/1934 | Shannon | |
| 1,982,205 A | * | 11/1934 | Doman | 108/117 |
| 2,139,470 A | | 12/1938 | Schmeiser | |
| 2,482,012 A | | 9/1949 | Marks | |
| 2,557,594 A | * | 6/1951 | Bryan | 108/118 |
| 2,624,469 A | | 1/1953 | Cadwall et al. | |
| 2,854,044 A | | 9/1958 | Raguse | |
| 3,342,226 A | | 9/1967 | Marcoux et al. | |
| 3,845,933 A | | 11/1974 | Heizer, Jr. | |
| 4,181,057 A | | 1/1980 | Bassett | |
| 4,230,329 A | | 10/1980 | Johnson | |
| 4,231,557 A | | 11/1980 | Blachly et al. | |
| 4,269,096 A | | 5/1981 | Boone | |
| 4,284,286 A | * | 8/1981 | Lewallen | 280/30 |
| 4,377,099 A | | 3/1983 | Howe | |
| 4,611,823 A | * | 9/1986 | Haas | 280/641 |
| 4,639,005 A | | 1/1987 | Birkley | |
| 4,640,326 A | | 2/1987 | Hewitt | |

(Continued)

FOREIGN PATENT DOCUMENTS

| | | | | |
|---|---|---|---|---|
| EP | 0532132 A2 * | 3/1993 | | B23Q 9/00 |

(Continued)

OTHER PUBLICATIONS

DeWalt 10 in. Table Saw with Stand at sears.com, 6 pages.

(Continued)

*Primary Examiner*—J. Allen Shriver
(74) *Attorney, Agent, or Firm*—Brooks Kushman P.C.

(57) ABSTRACT

The present invention discloses a collapsible stand for a bench-top power tool and methods therefore. The stand includes a structural member pivotally secured to a lower peripheral region of a base of a power tool. A slidable member is slidably and pivotally connected to the lower peripheral region and is pivotally connected to the pivotal structural member. Lower distal ends of both the pivotal and slidable structural members provide feet for supporting the associated power tool in an expanded orientation thereof. As the stand is collapsed, a top end of the slidable structural member slides towards a top end of the pivotal structural member. Both structural members may be pivoted to an orientation generally parallel with the lower peripheral region and may be locked thereto by a locking mechanism. A pair of wheels are rotatably connected to the base for transporting the stand and power tool thereupon.

25 Claims, 9 Drawing Sheets

U.S. PATENT DOCUMENTS

| | | | | |
|---|---|---|---|---|
| 4,776,545 | A | 10/1988 | Miyamoto | |
| 4,860,807 | A * | 8/1989 | Vacchiano | 144/286.1 |
| 4,874,025 | A | 10/1989 | Cleveland | |
| 4,969,496 | A | 11/1990 | Romans | |
| 5,067,535 | A * | 11/1991 | Wolff | 144/286.1 |
| 5,299,817 | A | 4/1994 | Chang | |
| 5,308,094 | A | 5/1994 | McWhorter et al. | |
| 5,320,150 | A | 6/1994 | Everts et al. | |
| 5,383,977 | A | 1/1995 | Pearce | |
| 5,437,319 | A | 8/1995 | Garuglieri | |
| 5,462,102 | A | 10/1995 | Searfoss | |
| 5,479,840 | A | 1/1996 | Hilliard et al. | |
| 5,518,053 | A | 5/1996 | Robison | |
| 5,526,856 | A | 6/1996 | Pedri | |
| 5,542,639 | A | 8/1996 | Wixey et al. | |
| 5,551,773 | A | 9/1996 | Cottrell | |
| 5,592,981 | A | 1/1997 | Derecktor | |
| 5,603,491 | A | 2/1997 | Murrell | |
| 5,615,451 | A | 4/1997 | Peterson et al. | |
| 5,651,298 | A | 7/1997 | Break et al. | |
| 5,664,612 | A | 9/1997 | Klemma | |
| 5,725,037 | A | 3/1998 | Faulhaber | |
| 5,746,193 | A * | 5/1998 | Swan | 125/13.03 |
| 5,778,953 | A | 7/1998 | Braddock | |
| 5,782,279 | A | 7/1998 | Stecker, Sr. | |
| 5,785,293 | A | 7/1998 | Ford et al. | |
| 5,868,185 | A | 2/1999 | Poling et al. | |
| 5,957,649 | A | 9/1999 | English, Jr. et al. | |
| 6,026,931 | A | 2/2000 | Swiderski | |
| 6,079,931 | A | 6/2000 | English, Jr. et al. | |
| 6,109,625 | A | 8/2000 | Hewitt | |
| 6,155,318 | A | 12/2000 | Underwood | |
| 6,182,724 | B1 | 2/2001 | Chou et al. | |
| 6,203,053 | B1 | 3/2001 | Sohrt et al. | |
| 6,240,987 | B1 * | 6/2001 | Birkeland | 144/286.1 |
| 6,360,797 | B1 * | 3/2002 | Brazell et al. | 144/286.1 |
| 6,435,460 | B1 * | 8/2002 | Van Cleave et al. | 248/164 |
| D471,287 | S | 3/2003 | Sommerville et al. | |
| 6,530,583 | B1 | 3/2003 | Mueller | |
| 6,546,978 | B2 | 4/2003 | Thoman | |
| 6,565,165 | B2 | 5/2003 | Switkes | |
| 6,568,308 | B2 | 5/2003 | Ricker | |
| 6,578,856 | B2 * | 6/2003 | Kahle | 280/30 |
| 2002/0179181 | A1 | 12/2002 | Murphy | |
| 2003/0051526 | A1 | 3/2003 | Cleave et al. | |
| 2003/0097920 | A1 | 5/2003 | Ransom et al. | |
| 2004/0187666 | A1 * | 9/2004 | Huang | 83/477.2 |

FOREIGN PATENT DOCUMENTS

| | | | | |
|---|---|---|---|---|
| GB | 2051690 | A * | 5/1979 | B62B 1/20 |

OTHER PUBLICATIONS

Bill Krier, “Wheel Deals, Mobile bases add flexibility and convenience to your shop,” Wood Magazine, Dec. 1998, pp. 80-83.

* cited by examiner

COLLAPSIBLE STAND FOR A BENCH-TOP POWER TOOL

BACKGROUND OF THE INVENTION

1 Field of the Invention

The invention relates to collapsible stands, particularly to collapsible stands for bench-top power tools and a method therefore.

2. Background Art

The prior art teaches a variety of stands for supporting bench-top power tools. The prior art stands include various features for enhancing portability and mobility. For example, the prior art teaches collapsible stands that may be collapsed to a compact and generally planar arrangement for transporting the stand when not in use. Conventional bench-top power tool stands includes features for supporting the power tool and securing the power tool thereto for relatively sturdy support during operation of the power tool. A draw-back of such prior art stands is that sturdiness is limited by the size of the legs of the stand in order to facilitate compactness of the stand.

The prior art also teaches collapsible work benches that are provided separate from the power tool for supporting a tool thereon. These workbenches are not limited to collaps-ible dimensions associated with a specific power tool.

A goal of the present invention is to provide a collapsible stand for a bench-top power tool that is sufficiently compact yet stable for supporting a bench-top power tool and may be readily collapsed for transporting the power tool.

SUMMARY OF THE INVENTION

An aspect of the present invention is to provide a collapsible stand for a bench-top power tool. The stand includes a first structural member having a top end pivotally connected to a base of an associated power tool at a first end of a lower peripheral region of the base. The first structural member also includes a bottom distal end forming at least one foot to rest upon an underlying support surface. The stand further includes a second structural member having a top end that is both pivotally and slidably connected to the lower peripheral region of the base. The second structural member includes a bottom distal end that also defines a foot to rest on the underlying support surface. An intermediate region of the second structural member is pivotally connected to an intermediate region of the first structural member. A pair of wheels are mounted to the base, approximate to the first end of the first structural member. In an expanded orientation of the stand, the second structural member top end is oriented approximate to a second end of the lower peripheral region, that is spaced apart from the first end. Due to the spacing of the top ends and the pivotal connection of the intermediate regions of the first and second structural members, the bottom ends of the first structural members are spaced apart as well for providing stable support to the power tool. As the stand is collapsed, the second structural member top end converges towards the first structural member top end and the first and second structural members generally converge toward one another to provide a collapsed stand. The first and second structural members are locked relative to the power tool base by a locking member and are utilized by a user for transporting the power tool and stand upon the pair of wheels.

A further aspect of the stand is to provide a foot plan of the stand upon the floor in the expanded orientation that exceeds an associated foot plan of the power tool base.

Another aspect of the present invention is to provide a track within the power tool base for facilitating the sliding engagement of the second structural member thereto.

Yet another aspect of the present invention is to provide a frame within the lower peripheral region of the power tool base for stable support of the power tool upon the stand.

A further aspect of the present invention is to provide a method for collapsing the stand, including the steps of tilting the power tool onto a side of the power tool, unlatching a slidable structural member, translating the slidable structural member to an orientation generally parallel to that of a pivotal structural member that is pivotally connected to both the frame and the slidable structural member, pivoting both structural members to an orientation parallel with the frame, and latching one of the structural members to the frame.

An even further aspect of the invention is a method for expanding the stand. The method includes the steps of resting the power tool on its side, unlatching the slidable structural member, pivoting the slidable structural member and a pivotal structural member to an orientation that is nonparallel with the frame, translating the slidable structural member to an orientation generally divergent to that of the pivotal structural member that is pivotally connected to both the frame and the slidable structural member, and latching one of the structural members to the frame.

The above aspects and other aspects, objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
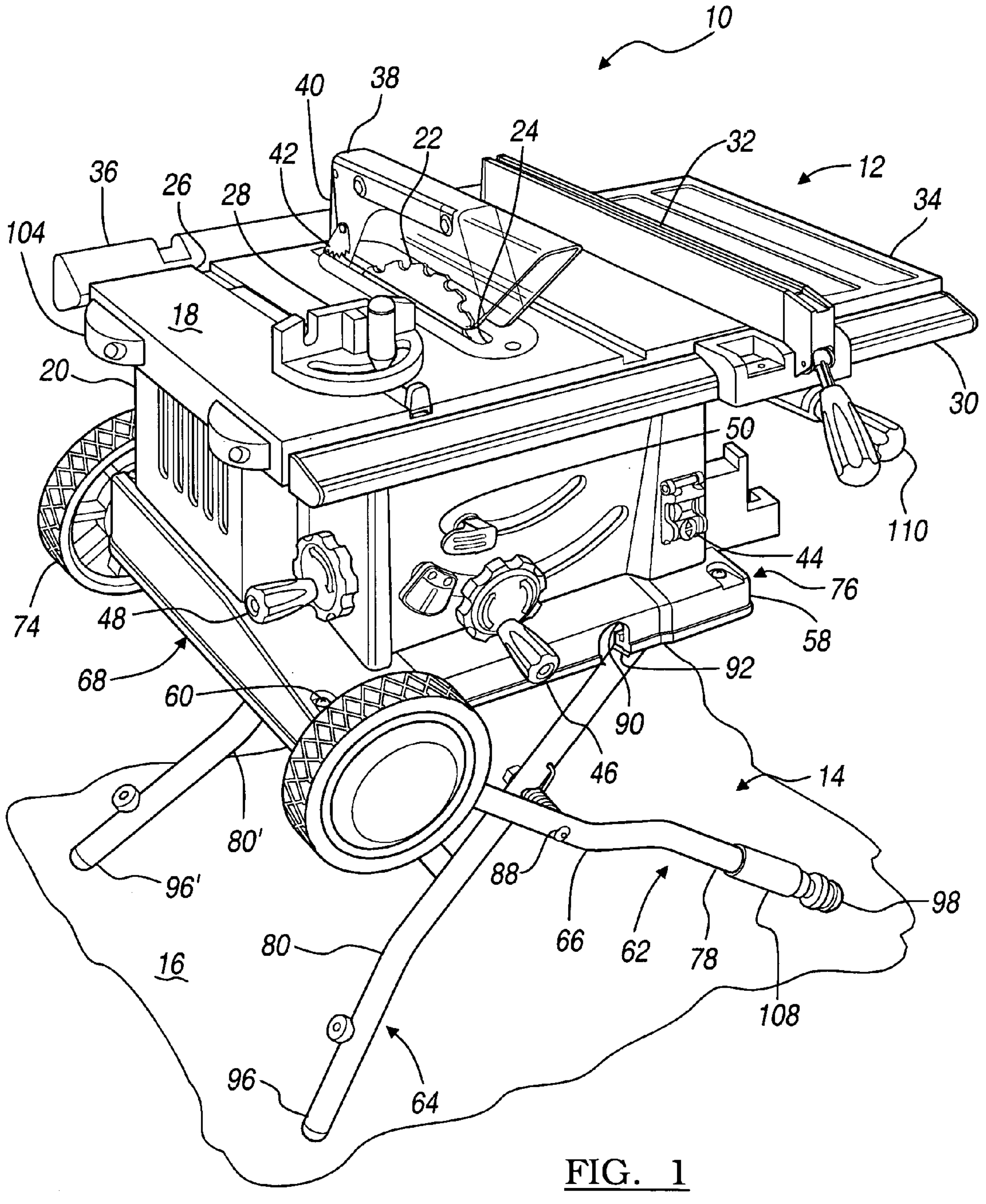
FIG. 1 is a perspective view of a portable bench-top power tool assembly having a collapsible stand in accordance with the present invention.

With reference now to FIG. 1, a preferred embodiment portable power tool assembly is illustrated and referenced generally by numeral 10. The portable power tool assembly 10 includes both a bench-top power tool, specifically illustrated in the preferred embodiment as a portable table saw 12, and a collapsible stand 14 illustrated supporting the table saw 12 upon an underlying support surface 16. The table saw 12 is similar to conventional prior art portable table saws, which are commonly used at job sites wherein portability of the table saw facilitates ease and routine setup before operation, and clean up thereafter.

Specifically, the preferred embodiment table saw 12 includes a generally planar table 18 for supporting workpieces thereon. A base 20 is provided for housing the operational elements of the table saw 12 and for supporting the table 18. A saw blade 22 is provided mounted to a spindle (not shown) that is driven by a motor (not shown) that is housed within the base 20. The saw blade 22 extends through a slot 24 formed through the table 18 for performing cutting operations. The table 18 includes a plurality of channels 26 formed therein for receiving a miter gauge 28 that is utilized for orienting the workpiece relative to the saw blade. The table saw includes a longitudinal rail 30 for supporting a rip fence 32 therealong. The rip fence 32 is provided for establishing a dimension between the rip fence 32 and the saw blade 22 for sliding the workpiece therealong. The table saw 12 further includes a sliding table extension 34 for expanding the longitudinal support area provided by the table 18. An outfeed support 36 for supporting workpieces is provided on the outfeed side of the saw blade 22.

The preferred embodiment table saw 12 includes a blade guard assembly 38 for covering the saw blade 22. The blade guard assembly 38 further includes a riving knife 40 sized and aligned to the kerf of the saw blade 22 to maintain the spacing of the cut workpiece on the outfeed side of the saw blade 22. A pair of anti-kickback pawls 42 are provided to prevent the saw blade 22 from forcing a workpiece in a direction from the outfeed side to the infeed side.

The preferred embodiment table saw 12 includes a plurality of operational controls. A switch 44 is provided for selectively imparting power to the motor which drives the saw blade 22. Additionally, a blade adjusting handle 46 is provided for adjusting the height of the saw blade 22 relative to the table 18. A bevel adjusting handle 48 is provided for adjusting the bevel angle of the saw blade 22, which is defined as the offset angle from an orientation perpendicular to the table saw surface 18. Specifically, the saw blade 22 is illustrated in FIG. 1 as being perpendicular to the table 18 and therefore is illustrated at a bevel angle of zero degrees. A bevel locking lever 50 is also provided for maintaining the bevel angle.

Figure 2:
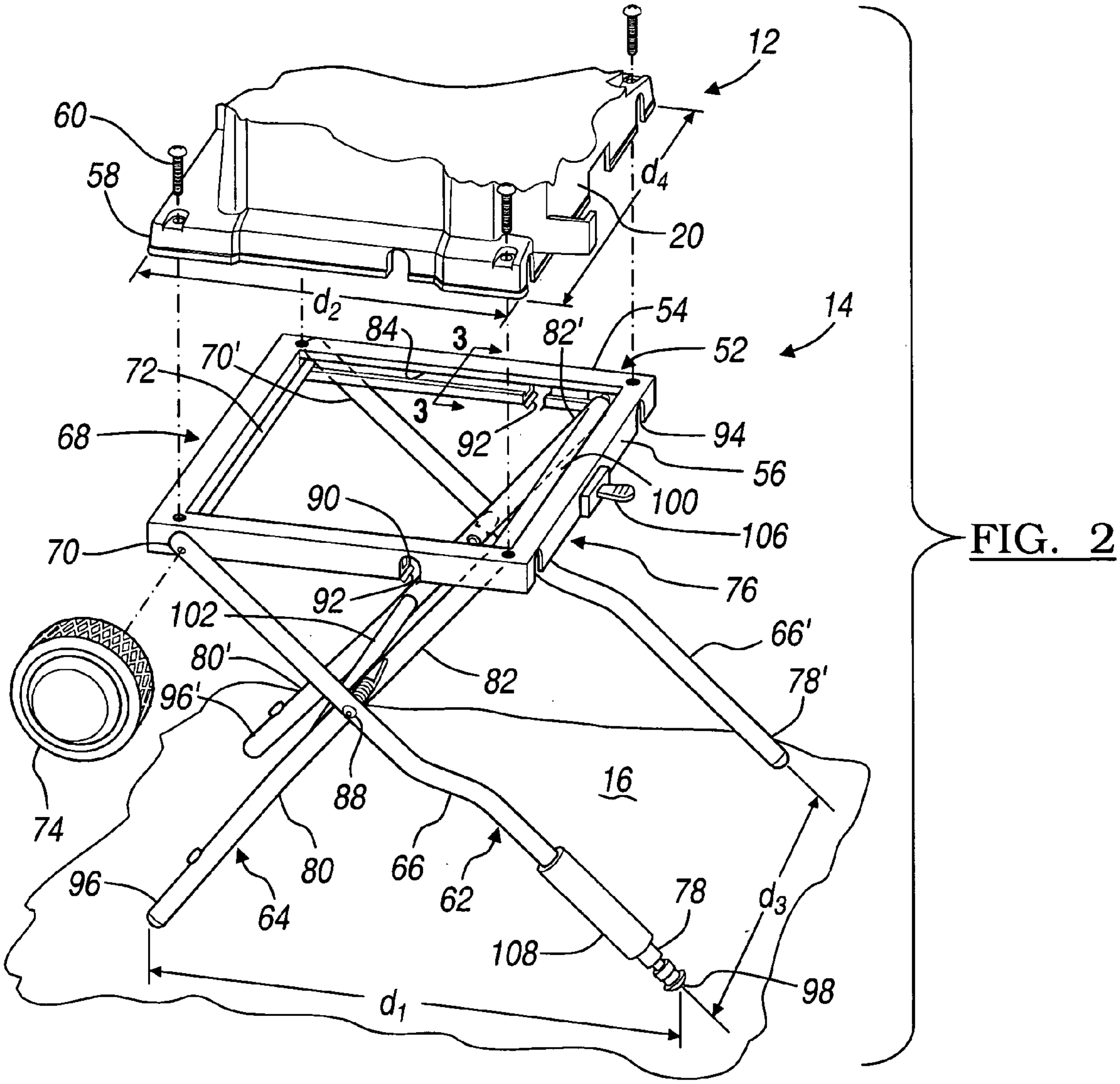
FIG. 2 is a partially exploded perspective view of the portable power tool assembly of FIG. 1.

Referring now to FIGS. 1 and 2, the collapsible stand 14 is illustrated in greater detail. The stand 14 includes a generally rectangular frame 52 formed of a pair of longitudinal members 54 and a pair of transverse members 56. The frame 52 is sized to be received within a lower peripheral region 58 of the base. The base 20 of the preferred embodiment is formed from a plastic injection molding manufacturing process, and is formed generally hollow, and having a generally uniform wall thickness. Accordingly, the lower peripheral region 58 of the base 20 rests upon the frame 52 and is supported thereby, preferably through an area of contact to evenly distribute the load of the table saw 12 and the vibrations caused thereby to the frame 52 for subsequent distribution of these loads through the stand 14. A plurality of fasteners 60 are provided for securing the lower peripheral region 58 of the base 20 to the frame 52.

The frame 52 is supported by a pivotal support member 62 and a slidable support member 64. The pivotal support member 62 is provided by a pair of pivotal support legs 66, 66', each pivotally connected to a first longitudinal end 68 of the frame 52, at a pivotal support top end 70, 70'. Each pivotal support top end 70, 70' of the pivotal support legs 66, 66' are pivotally mounted to the frame 52 laterally outboard of the frame 52, and laterally outboard of the base lower peripheral region 58. The preferred embodiment stand 14 includes an axle 72 extending transversely through the frame 52 and laterally outboard from the transverse members 54 for spacing the first structural member pivotal structure top ends 70, 70' away from the base lower peripheral region 58. Further, a pair of wheels 74 are provided, each mounted to opposed distal ends of the axle 72, for transportation of the table saw 12 and stand 14 in a collapsed orientation of the stand 14 as a unitary portable power tool assembly 10. The pivotal support legs 66, 66' of the pivotal support member 62 extend in a direction downward in the expanded position of the stand 14, and extend longitudinally in the direction toward a second longitudinal end 76 of the frame. The pivotal support legs 66, 66' each terminate at a pivotal support bottom end 78, 78' thereof, each defining a foot to rest on the underlying support surface 16.

Figure 3:
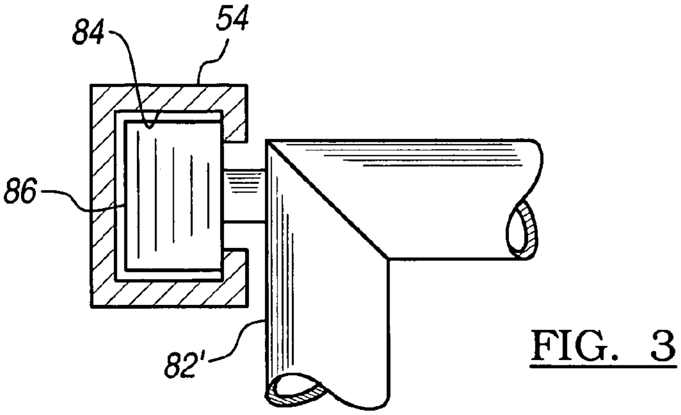
FIG. 3 is an enlarged partial section view taken along section line 3—3 in FIG. 2.

The slidable support member 64 includes a pair of spaced apart slidable support legs 80, 80' as well. Slidable support top ends 82, 82' of each slidable support legs 80, 80' are pivotally and slidably connected to the longitudinal members 54 of the frame 52. Referring to FIG. 3 and with reference to FIG. 2, each longitudinal member 54 of the frame 52 defines a track, having a channel 84 formed therein. Each channel 84 receives a sliding member 86 therein for longitudinal translation along the longitudinal member 54. The slidable support top ends 82, 82' of each slidable support legs 80, 80' are pivotally coupled to each respective sliding member 86 so that the slidable support top ends 82, 82' are limited for linear translation along the channels 84 and the slidable support legs 80, 80' may pivot relative to the sliding member 86.

Each pivotal support leg 66, 66' is pivotally coupled to the associated slidable support leg 80, 80' at an intermediate region of both legs. The pivotal connection of the pivotal support legs 66, 66' and the slidable support legs 80, 80' is facilitated by a pair of pivot bolts 88, 88'. The pivot bolts 88, 88' permit the pair of legs to pivot relative to one another about the respective intermediate regions thereof in a scissor like manner. Further, each pivot bolt 88, 88' provides a spaced apart connection between the respective pivotal support leg 66, 66' and the slidable support leg 80, 80' to accommodate the thickness of the associated longitudinal member 54 to avoid interference therewith. A slot 90 is formed in each longitudinal member 54 and the lower peripheral region 58 of the base 20 to provide clearance for the pivot bolts 88, 88' in the collapsed orientation of the stand 14. The slots 90 do not interrupt the travel of the sliding members 86 within the channels 84 because the slots 90 have a longitudinal width that is relatively smaller than the longitudinal length of the sliding members 86. Further, each slot 90 includes a pair of leading edges 92 to prevent the sliding member 86 from getting caught or jammed within the slot 90.

The transverse member 56 oriented along the second longitudinal frame end 76 includes a pair of slots 94 formed therein for providing clearance to the slidable support legs 80, 80' in the collapsed orientation of the stand.

The collapsible stand 14 provides relatively stable support for the table saw 12, yet is collapsible to a relatively compact assembly for facilitating mobility of the collapsible stand 14 and the table saw 12. Each of the slidable support legs 80, 80' terminate at a bottom distal end 96, 96', each forming a foot for resting upon the underlying support surface 16. At least one of the leg pivotal bottom ends 78, 78', 96, 96', specifically pivotal support leg bottom end 78 is provided with a leveling foot 98 for stabilizing the stand 14 relative to the underlying support surface 16 and overcoming irregularities or inconsistencies in the surface.

The prior art includes collapsible stands for bench-top power tools that collapse into an assembly secured to the power tool for facilitating transportation of both the stand and the power tool. However, such prior art collapsible stands sacrifice stability in the stand itself in order to accommodate compactness. For example, the prior art includes collapsible stands that have a pair of support members that are independent of one another to each fold under the base of the tool. For example, see Assignee's U.S. Pat. No. 6,360,797 B1, issued on Mar. 26, 2002 which discloses a power tool and portable support assembly, and is incorporated in its entirety by reference herein. In contrast the stand 14 of the present invention interconnects the pivotal support member 62 and the slidable support member 64 to enhance stability of the stand 14. The prior art has included a pair of crossed support members pivotally connected at an intermediate region, however the bottom ends of the support members diverge as the stand is collapsed and therefore is limited in overall length in order to accommodate compactness. In contrast, the support members 62, 64 of the present invention converge at both the top ends 70, 82 and the bottom ends 78, 96 thereof due to the tracks provided in the longitudinal members 54 to enhance compactness.

Accordingly, the legs 66, 66' 80, 80' of the collapsible stand 14 are provided with a length sufficient so that collapsible stand 14 has an overall foot plan that is greater than a foot plan of the base 20. For example, in the expanded orientation of the collapsible stand 14 the overall longitudinal displacement of the leg bottom ends 78, 96 illustrated by dimension $d_1$ is substantially greater than a longitudinal overall dimension $d_2$ of the base 20. An overall lateral dimension of the base 14 is represented by dimension $d_3$ and is greater than an associated overall lateral dimension $d_4$ of the base 20. This greater lateral dimension $d_3$ is provided by the pivotal support legs 66, 66' being disposed laterally outboard of the frame 52. The lateral dimension of the slidable support bottom ends 96, 96' is substantially equivalent to $d_3$ because the slidable support bottom ends 96, 96' are bent laterally outboard to match the footing of the pivotal support member 62. Accordingly, the collapsible stand 14 provides stabilized support to the table saw 12 wherein the legs are interconnected and the foot plan is not limited by the dimensions of the table saw 12. To further enhance such stability, the slidable support member 64 includes a first cross member 100 interconnecting the slidable support top ends 82, and a second cross member 102 interconnecting the slidable support legs 80 at intermediate regions thereof, specifically below the pivotal connections of the legs.

Figure 4:
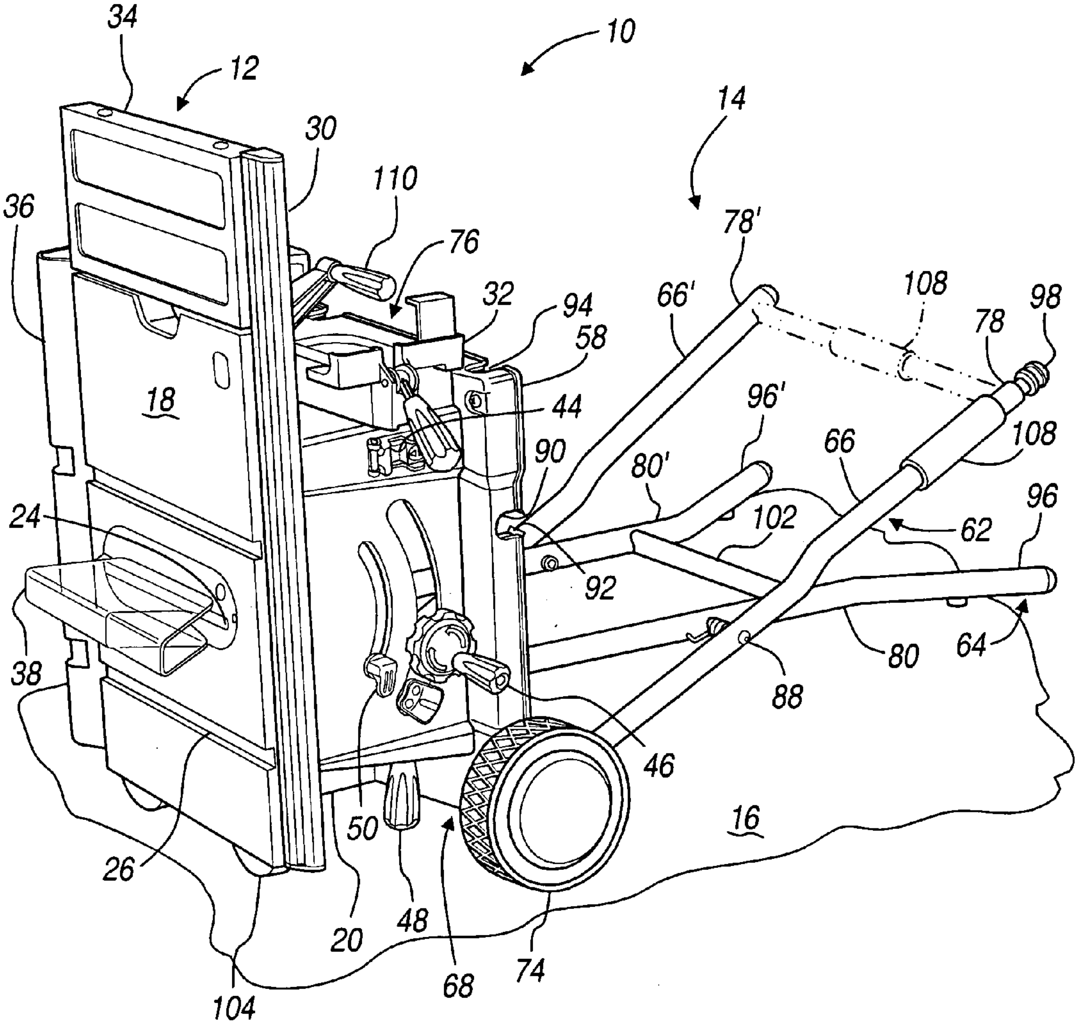
FIG. 4 is a perspective view of the portable power tool assembly of FIG. 1, illustrated with the power tool resting on a side thereof.

The table saw 12 and collapsible stand 14 may be rested on the first longitudinal end 68 of the table saw 12 as the stand 14 is collapsed or expanded, as illustrated in FIG. 4. The table saw 12 includes a pair of bumper pads 104 mounted to the table 18. The pads 104 are generally aligned with the wheels 74 so that the lower peripheral region 58 extends generally vertically when the pads 104 and wheels 74 are rested upon the underlying support surface 16. The second longitudinal end 76 of the base 20 includes bracket for retaining the rip fence 32 and the miter gauge 28 (not shown in FIG. 4) for retaining these accessories relative to the portable power tool assembly 10 during setup, tear down and transportation.

Figure 5:
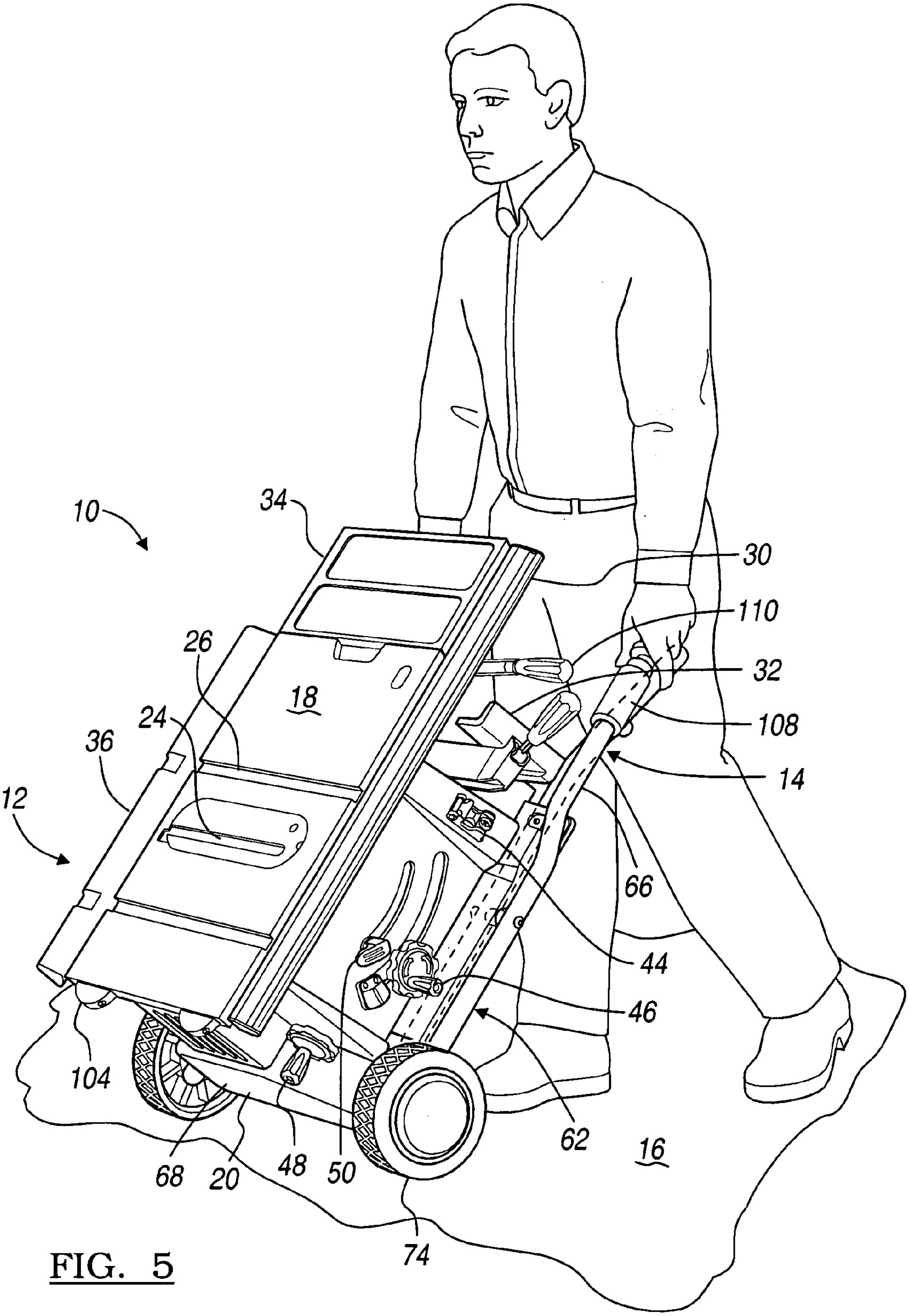
FIG. 5 is a perspective view of the portable power tool assembly of FIG. 1, illustrated as being transported by a user.

The collapsible stand 14 collapses in a manner wherein the slidable support top ends 82, 82' translate along the track from the second longitudinal end 76 to the first longitudinal end 68. As the slidable top ends 82, 82' converge with the pivotal support top ends 70, 70', the pivotal support member 62 and slidable support member 64 generally converge to an orientation near parallel. Accordingly, the pivotal support legs 66, 66' each include a bend formed in an intermediate region thereof so that the pivotal support bottom ends 78, 78' are offset to provide clearance for the outboard laterally flared slidable support bottom ends 96. The pivotal and slidable support members 62, 64 are then pivoted to an orientation generally parallel and aligned with the lower peripheral region 58 of the base 20 and locked in position relative thereto. Referring now to FIG. 5, the collapsible stand 14 is illustrated in a fully collapsed position thereby permitting a user to grasp the support leg bottom ends 78, 96, 78', 96' and transport the portable power tool assembly 10 upon the wheels 74 along the underlying support surface 16. Therefore the stand 14 aids in supporting and transporting the table saw 12. For an example of a collapsible stand that is not utilized for transporting the saw, please refer to Assignee's copending U.S. Patent Application, titled "Collapsible Stand For A Bench-Top Power Tool", Ser. No. 10/649,220, filed Aug. 25, 2003, which is incorporated in its entirety by reference herein.

Figure 6A:
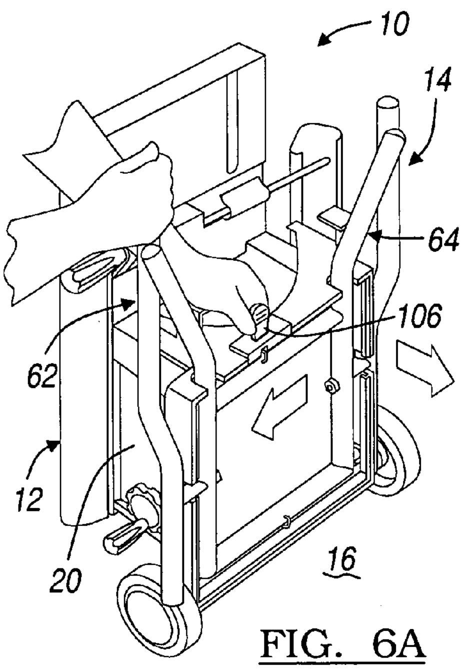
FIGS. 6A–6G illustrate a method for expanding the collapsible stand of FIG. 1.
Figure 6B:
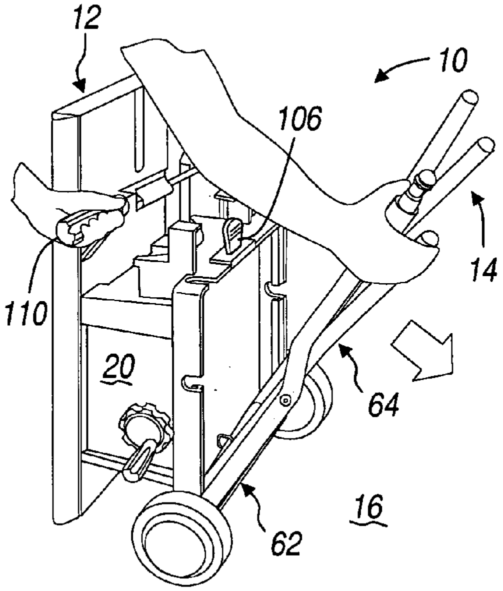
Figure 6C:
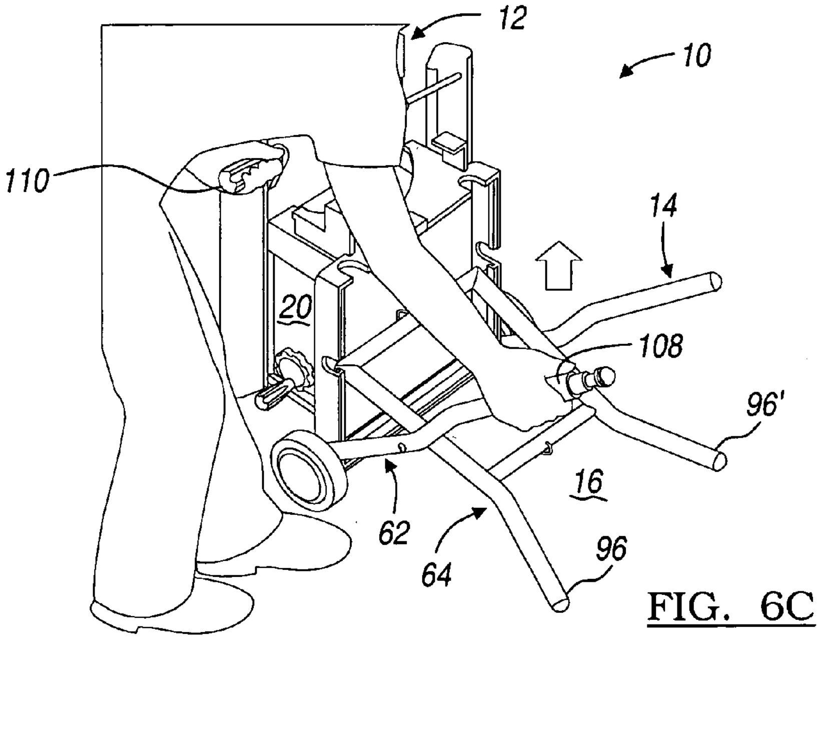

Referring now to FIGS. 6A–6G, a method for uncollapsing or expanding the collapsible stand 14 of the preferred embodiment is illustrated in greater detail. Referring specifically to FIG. 6A, the collapsed portable power tool assembly 10 is rested upon the first longitudinal end 68. The collapsible stand 14 further comprises a locking mechanism, specifically a spring loaded latch 106 for locking the collapsible stand 14 in the collapsed orientation. The latch 106 is mounted to the frame 52 at the second longitudinal end 76 and cooperates with the second cross member 102 in the collapsed orientation of the stand 14. The first step requires the user to urge the latch 106 towards the user thereby unlatching the second cross member 102 therefrom and permitting the pivotal support member 62 and the slidable support member 64 to be pivoted away from the frame 52. Referring now to FIG. 6B, the user pivots the pivotal and slidable support member 62 and 64 towards the underlying support surface 16. Referring now to FIG. 6C, once the user urges the slidable support top ends upward in the track (not shown), then the user grasps a grip handle 108 formed on the pivotal support bottom end 78 and pivots the pivotal support member 62 away from the underlying support surface 16. The grip handle may also be provided on a cross member as illustrated in phantom in FIG. 4. This pivoting of the pivotal support member 62 causes the slidable support top end 82 to translate within the track towards the second longitudinal frame end 76. The table saw 12 further includes a tilt handle 110 mounted to the underside of the table 18. The user may grasp the tilt handle 110 during the expansion of the collapsible stand 14 to provide a reaction support to the table saw 12 to prevent tipping it over.

Figure 6D:
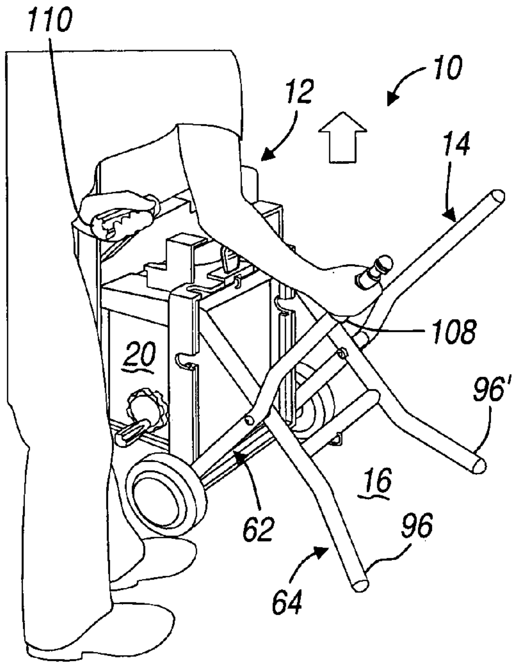
Figure 6E:
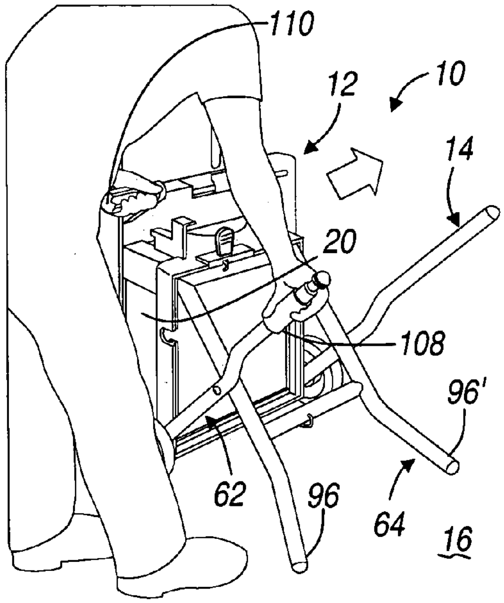
Figure 6F:
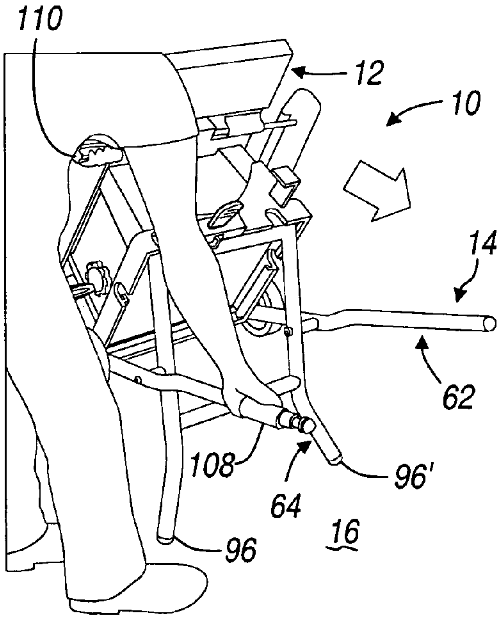
Figure 6G:
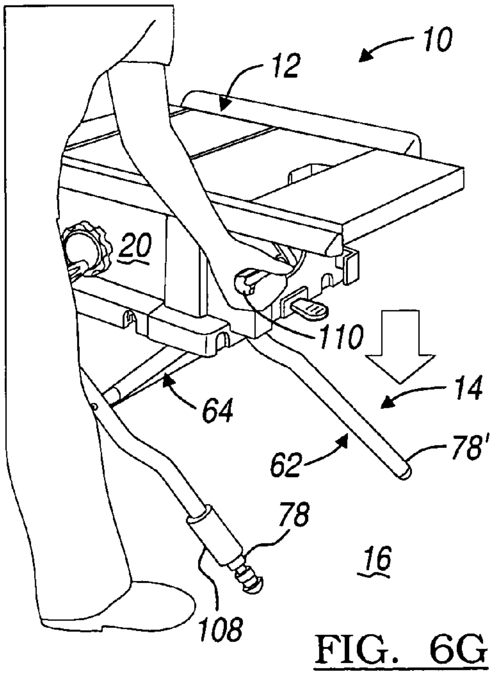

Referring now to FIG. 6D, as the legs reach the fully expanded position, preferably the first cross member 100 engages the latch 106 and becomes locked thereto. Locking in the open expanded position is optional and not necessary to practice the invention. Referring not to FIG. 6E, the user grasps both the tilt handle 110 and the grip handle 108 and pivots the table saw 12 and expanded stand 14 about the slidable support bottom ends 96, 96' thereby tilting the table saw 12 from the ground as illustrated in FIG. 6F until the pivotal support bottom ends 78 contact the underlying support surface 16 as in FIG. 6G. In the orientation of the portable power tool in FIG. 6G, the table saw 12 may be utilized for cutting operations.

Figure 7A:
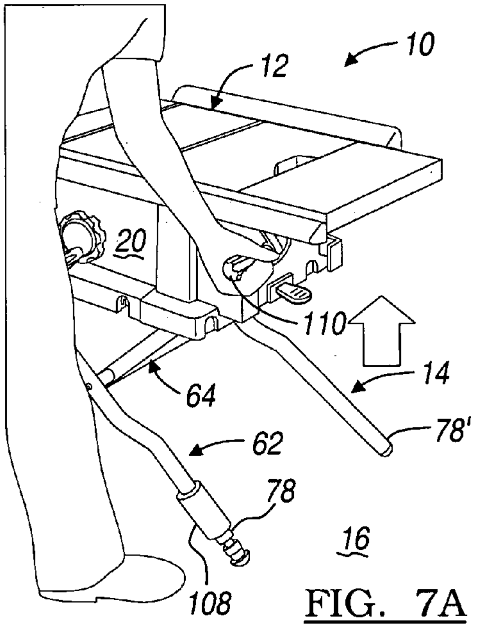
FIGS. 7A–7G illustrate a method for collapsing the stand of FIG. 1.

Upon completion of use of the portable power tool assembly 10, the user may collapse the stand to transport it away from a work site. Referring now to FIGS. 7A–7G, a method for collapsing the collapsible stand 14 is illustrated in greater detail. Referring specifically to FIG. 7A, the user may grasp the tilt handle 110 and begin gently tilting the table saw 12 and collapsible stand 14 about the slidable support bottom ends 96.

Figure 7B:
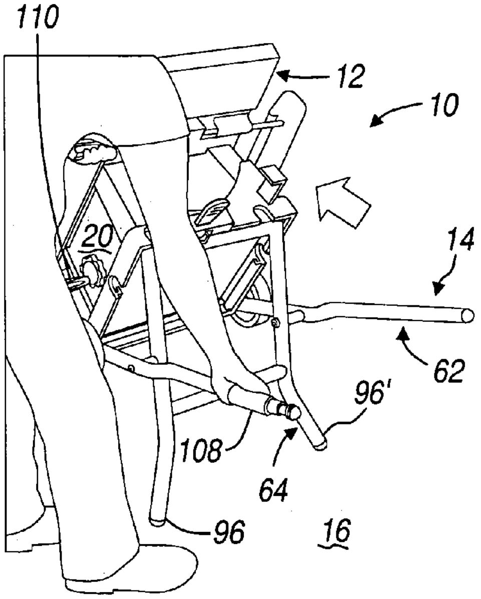
Figure 7C:
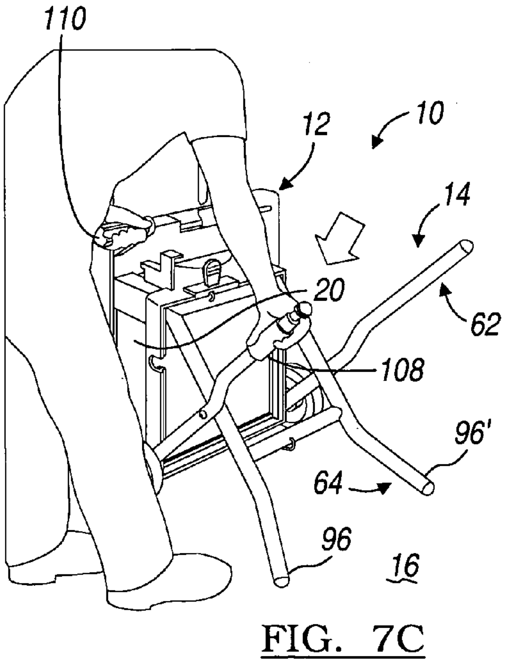

With reference to FIG. 7B, once the table saw 12 and collapsible stand 14 begin to tilt, the user may grasp the grip handle 108 to provide steady support to the table saw 12 as the table saw 12 and collapsible stand 14 are tilted onto the first longitudinal end 68, as illustrated in FIG. 7C.

Figure 7D:
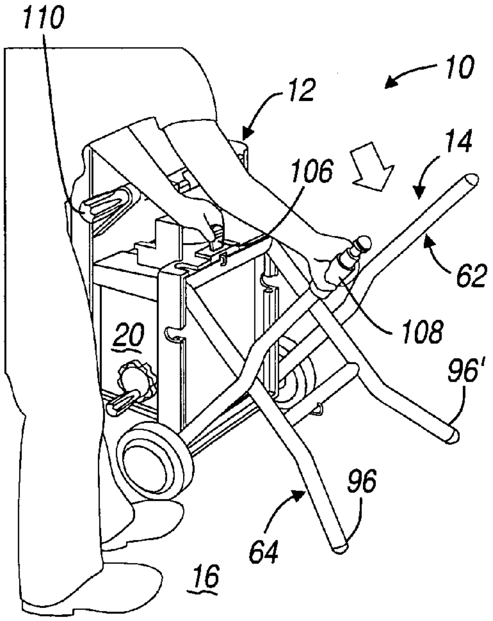
Figure 7E:
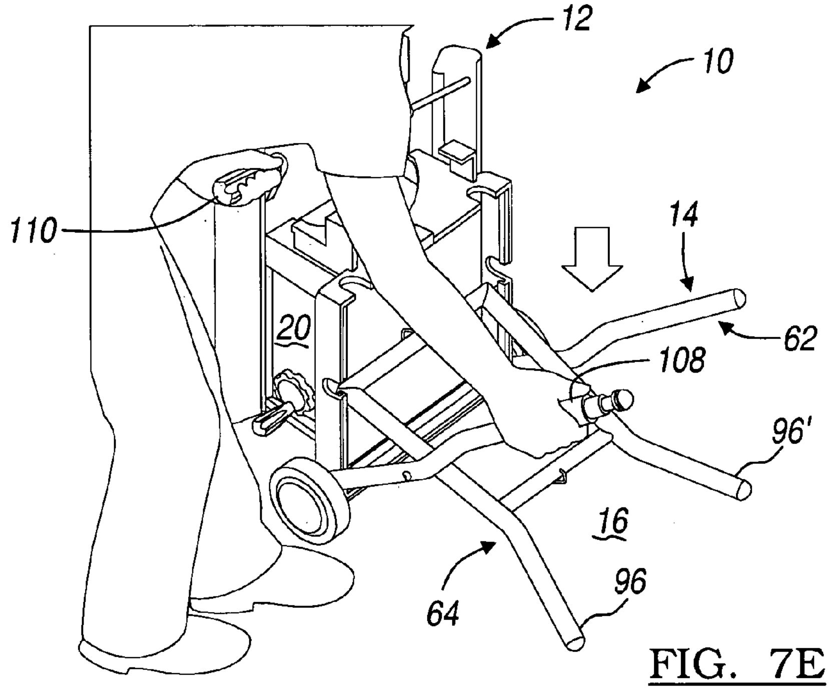
Figure 7F:
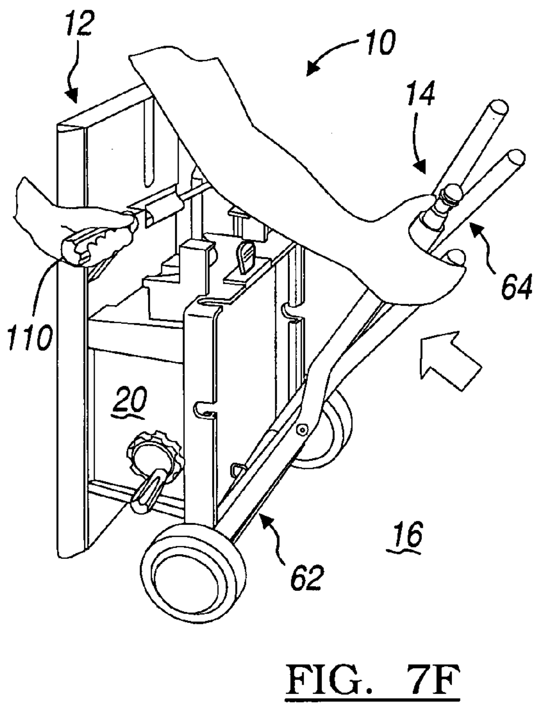
Figure 7G:
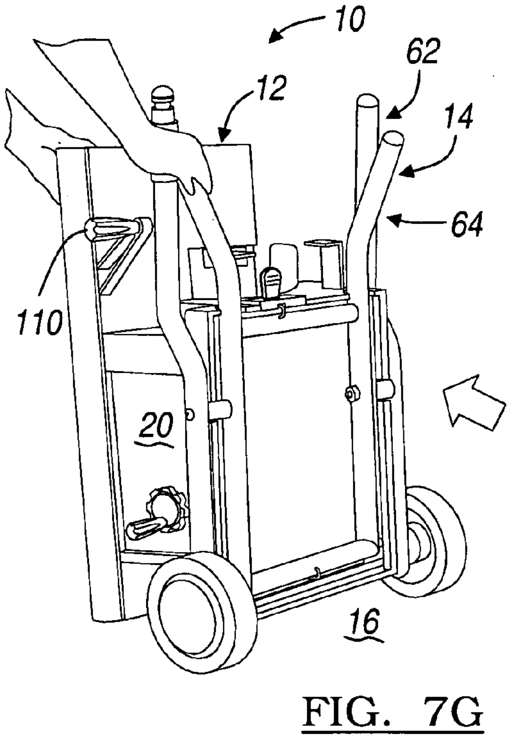

Referring to FIG. 7D, the user grasps the grip handle 108 and unlatches the collapsible stand 14 by biasing the latch 106 (if the unit locks in the expanded postion). The user then pivots the pivotal support member 62 towards the underlying support surface as illustrated in FIG. 7E until the slidable support top end 82 translates to the first longitudinal end 68. Then, as illustrated in FIG. 7F the user pivots both the pivotal support member 62 and slidable support member 64 towards the frame 52 and latches the collapsible stand 14 to the frame 52 at an orientation parallel thereto as illustrated in FIG. 7G. In this collapsed position, the user may transport the portable power tool assembly 10 upon the wheels 74.

Figure 8:
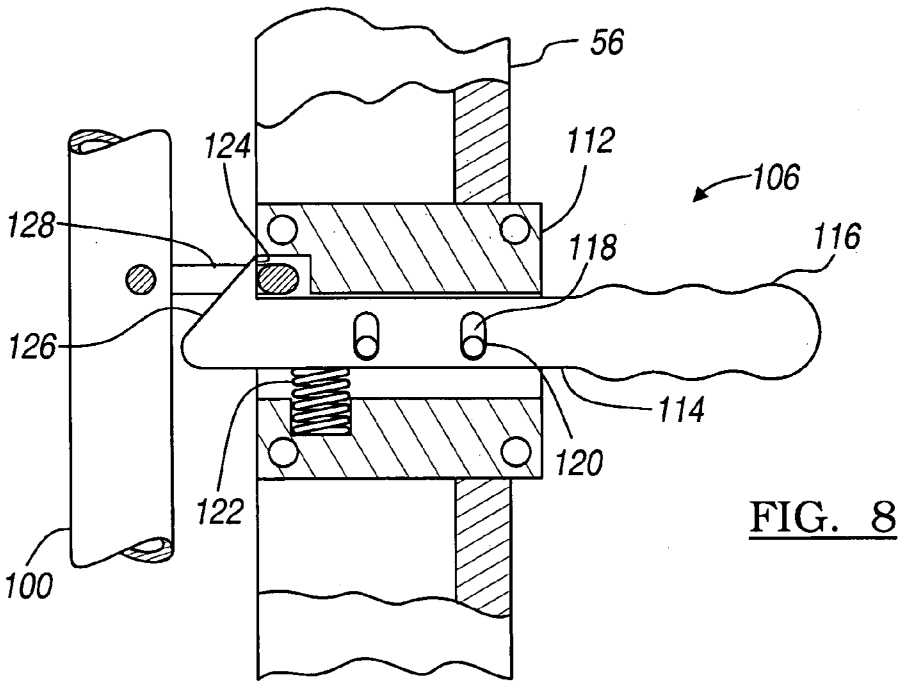
FIG. 8 is an enlarged, partial section, top plan view of the latching mechanism of the collapsible stand of FIG. 1.

Referring now to FIG. 8, the latch 106 is illustrated enlarged and as a partial section view. The latch 106 includes a mounting bracket 112 secured to the transverse member 56 at the second longitudinal end 76 of the frame 52. A longitudinal lever 114 has a latch grip portion 116 extending therefrom to be biased by the user. The lever 114 is fixed for limited lateral translation relative to the mounting bracket 112 by an included pair of slots 118 formed therein for translation about a pair of pins 120 that are secured to the mounting bracket 112. A spring 122 is disposed within the mounting bracket 112 for urging the lever 114 laterally into a locked position. The inboard end of the lever 114 includes a latch step 124 and an outboard leading edge 126. The first cross member 100, illustrated in FIG. 8 include a loop 128 affixed thereto. As the first cross member 100 is translated towards the latch 106, the loop 128 engages the leading edge 126 thereby shifting the lever 114 laterally in an unlocked direction. As the loop 128 travels past the leading edge 126 and is received within the latch step 124 the spring 122 urges the lever 114 back to the lock position thereby retaining the loop 128 and first cross member 100 relative to the transverse member 56 at the second longitudinal frame end 76. The first cross member 100 may be unlatched from the latch 106 by a force imparted to the latch grip portion 116 by the user, thereby overcoming the bias created by the spring 122.

Figure 9:
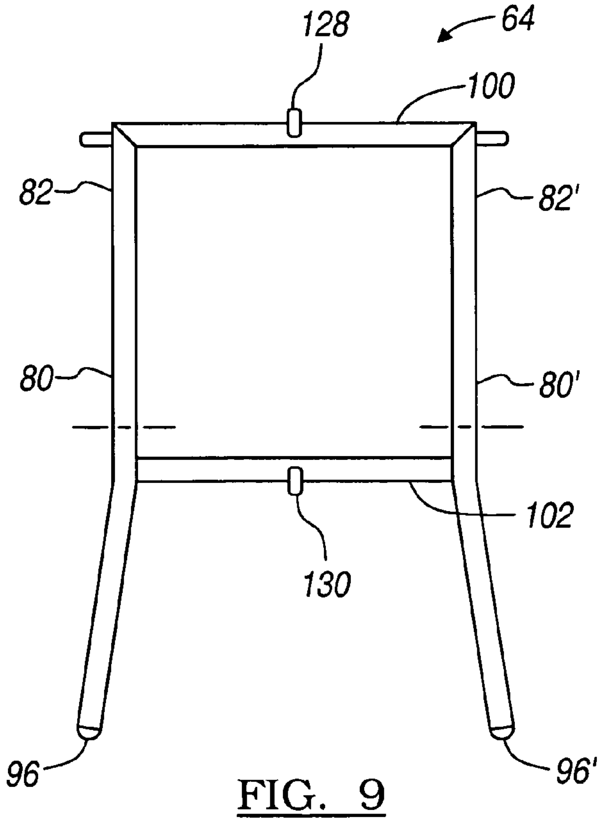
FIG. 9 is a side view of one of the structural members of the collapsible stand in FIG. 1.

Referring now to FIG. 9, the slidable support member 64 is illustrated in a view taken in a direction that is normal to the legs 80, 80' thereof. The first and second cross members 100, 102 each include a loop 128, 130 for engagement with the latch. The loop 128 on the first cross member 100 is utilized for locking the collapsible stand 14 in the expanded orientation. The loop 130 on the second cross member 102 is utilized for locking the collapsible stand 14 in the collapsed orientation. The first and second cross members 100, 102 are spaced apart a distance that is generally equivalent to an internal longitudinal dimension of the frame 52 in order to coordinate the cooperation with the latch at prescribed orientations, specifically, fully collapsed and fully expanded.

In summary, the present invention provides a portable power tool assembly 10 that is structurally supported by a stable collapsible stand 14 that is also relatively compact in the collapsed orientation thereof. The invention contemplates the collapsible stand 14 may be provided separate from an associated power tool or may be provided with the power tool as an assembly as disclosed in the preferred embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A collapsible stand for a bench-top power tool, the stand comprising: PARA2a first structural member having a top end pivotally connected to a base of a power tool at a first end of a lower peripheral region of the base, an intermediate region and a bottom distal end defining at least one foot to rest on an underlying support surface; PARA2a second structural member having a top end pivotally and slidably connected to the lower peripheral region of the base of the power tool, an intermediate region pivotally connected to the first structural member intermediate region, and a bottom distal end defining at least one foot to rest on the underlying support surface; PARA2a locking mechanism mounted to the stand or the power tool base for maintaining a collapsed orientation of the stand relative to the power tool base; and PARA2a pair of wheels rotatably connected to the base proximate to the first end of the first structural member; PARA2wherein an expanded orientation of the stand is defined by the second structural member top end being oriented proximate to a second end of the lower peripheral region of the base, and being spaced apart from the first structural member top end and the second structural member bottom end being spaced apart from the first structural member bottom end to provide stable support to the power tool, and the second structural member converges towards the first structural member in a collapsed orientation of the stand whereby the second structural member top end is slid towards the first structural member top end and the second structural member pivots relative to the first structural member about the pivotal connection of the intermediate region whereby the second structural member bottom end is translated towards the first structural member bottom end for providing a compact collapsed stand that is locked relative to the power tool base by the locking member and utilized by a user for transporting the power tool and stand upon the pair of wheels.

2. The stand of claim 1 wherein the length of the first structural member and the length of the second structural member are sufficient to provide a foot plan of the stand in the expanded orientation that exceeds a foot plan of the power tool base for providing stable footing of the power tool relative to the underlying support surface.

3. The stand of claim 1 further comprising at least one track formed within the base of the power tool, the track being oriented generally perpendicular to an axis about which the first structural member pivots; and PARA2a sliding member pivotally attached to the second structural member and slidably engaged to the track for limited translation of the second structural member top end relative to the track.

4. The stand of claim 1 wherein at least one of the first and second structural members is further defined as a pair of spaced apart tubular legs.

5. The stand of claim 1 further comprising a handle formed on at least one of the first and second structural members to be grasped by the user.

6. The stand of claim 1 further comprising a pair of pads mounted to the power tool or power tool base spaced apart from the pair of wheels and generally lying in a plane that intersects the wheels and is perpendicular to the lower peripheral region of the power tool base, for permitting the stand and power tool to be supported collectively by the pair of wheels and the pair of pads in a tilted orientation of the power tool for supporting the power tool and stand as the stand is expanded or collapsed.

7. The stand of claim 1 wherein the bench-top power tool is further defined as a portable table saw.

8. The stand of claim 1 further comprising a frame structure including a pair of generally longitudinal members having first and second ends and being interconnected by at least one transverse member, the frame being affixed to the lower peripheral region of the power tool base in an orientation relative thereto wherein the longitudinal member first ends are oriented proximate to the first structural member top end and the longitudinal member second ends are oriented proximate to the second structural member top end in the expanded orientation of the stand, each of the pair of longitudinal members having a channel formed therein; and PARA2a pair of sliding members, each slidably received within the channel for limited longitudinal translation therealong; PARA2wherein the first structural member top end is pivotally connected to the frame first end, and the second structural member top end is pivotally connected to the pair of sliding members.

9. The stand of claim 8 wherein the frame provides an area contact with the power tool base lower peripheral region.

10. The stand of claim 8 wherein the frame is generally rectangular, and the at least one transverse member is further defined as a pair of opposed transverse members.

11. The stand of claim 10 wherein one of the pair of transverse members interconnects the longitudinal member second ends and has a slot formed therein, sized to receive the second structural member in the collapsed orientation of the stand.

12. The stand of claim 8 wherein the first structural member further comprises a pair of tubular legs oriented outboard of the frame and the second structural member.

13. The stand of claim 12 wherein each of the pair of wheels is pivotally connected to an axle extending through the frame and the associated leg of the first structural member.

14. The stand of claim 12 wherein the pair of channels formed in the frame face inboard; and PARA2wherein the second structural member further comprises a pair of legs mounted inboard of the frame, each leg being pivotally connected to the associated sliding member and the associated leg of the first structural member.

15. The stand of claim 14 further comprising a pair of pivot bolts, each pivot bolt being mounted to one of the first structural member legs and the associated second structural member leg for providing the pivotal connection therebetween and spacing the legs apart from each other; PARA2wherein the frame includes a pair of slots, each formed within one of the longitudinal members, for receiving the pivot bolt in the collapsed orientation of the stand.

16. The stand of claim 14 further comprising a lateral cross member interconnecting the pair of second structural member legs at the top end thereof.

17. The stand of claim 16 further comprising another lateral cross member interconnecting the pair of second structural member legs at an intermediate region thereof.

18. The stand of claim 17 wherein the distance between the pair of lateral cross members is generally equidistant to the internal longitudinal dimension of the frame.

19. The stand of claim 18 wherein the locking mechanism is further defined as a spring loaded latch for receiving one of the lateral cross members and latching it relative thereto for locking the stand in the collapsed or expanded orientation.

20. A method for collapsing and subsequently expanding a stand for a bench-top power tool, the method comprising the steps of: PARA2tilting the power tool onto a side thereof so that the expanded stand extends laterally outward; PARA2translating an upper portion of a slidable structural member towards an upper portion of a pivotal structural member that is pivotally connected to a frame of the stand that is mounted in a base of the power tool and the pivotal structural member is pivotally connected to the slidable structural member; PARA2pivoting the slidable and pivotal structural members to an orientation parallel with the frame; PARA2latching one of the slidable and pivotal structural members to the frame in a collapsed position of the stand; PARA2resting the power tool on a side thereof so that the collapsed stand extends generally upward; PARA2unlatching the slidable structural member of the stand from a latch that locks the sliding structural member in a fixed orientation relative to the frame; PARA2pivoting the slidable structural member and the pivotal structural member to an orientation that is non-parallel with the frame; and PARA2translating the slidable structural member to an orientation generally divergent to that of the pivotal structural member in an expanded position of the stand.

21. The method of claim 20 further comprising the step of: PARA2latching one of the slidable and pivotal structural members to the frame in the expanded position of the stand.

22. A portable bench-top power tool assembly comprising: PARA2a power tool having an upper region for performing a powered operation and having a base with a lower peripheral region; PARA2a rectangular frame mounted in the base lower peripheral region, the frame including a pair of longitudinal members and a pair of transverse members, each of the longitudinal members having a first end and a second end and each of the longitudinal members including an inboard facing channel formed therein; PARA2a sliding member received within in each channel; PARA2a first pair of legs, each having a top end displaced outboard of the frame and pivotally connected to the first longitudinal end of the frame, an intermediate region and a bottom distal end defining a foot to rest on an underlying support surface; PARA2a second pair of legs, each having a top end disposed inboard of the frame and pivotally connected to one of the sliding members, an intermediate region pivotally connected to the associated first leg, and a bottom distal end defining a to rest on the underlying support surface; PARA2a latching mechanism mounted to the frame for maintaining a collapsed orientation and an expanded orientation of the stand relative to the frame; and PARA2a pair of wheels rotatably connected to the frame proximate to the top end of the first pair of legs; PARA2wherein an expanded orientation of the stand is defined by the top end of the second pair of legs being oriented at the second end of the frame and the bottom end of the second pair of legs are oriented outboard of the first longitudinal frame end to provide stable support to the power tool, the second pair of legs converge towards the first pair of legs as the sliding members are slid from the second longitudinal frame end to the first longitudinal frame end and the first and second pairs of legs are pivoted to an orientation parallel with the frame for providing a compact collapsed stand that is locked relative to the frame by the locking member and utilized by a user for transporting the power tool upon the pair of wheels.

23. A collapsible stand for a bench-top power tool, the stand comprising: PARA2a first structural member having a top end pivotally connected to a base of a power tool at a first end of a lower peripheral region of the base, an intermediate region and a bottom distal end defining at least one foot to rest on an underlying support surface; PARA2a second structural member having a top end pivotally and slidably connected to the lower peripheral region of the base of the power tool, an intermediate region pivotally connected to the first structural member intermediate region, and a bottom distal end defining at least one foot to rest on the underlying support surface; PARA2a pair of wheels rotatably connected to the base proximate to the first end of the first structural member; and PARA2at least one pad mounted to the power tool or power tool base spaced apart from the pair of wheels, for permitting the stand and power tool to be supported collectively by the pair of wheels and the at least one pad in a tilted orientation of the power tool for supporting the power tool and stand as the stand is expanded or collapsed; PARA2wherein an expanded orientation of the stand is defined by the second structural member top end being oriented proximate to a second end of the lower peripheral region of the base, and being spaced apart from the first structural member top end and the second structural member bottom end being spaced apart from the first structural member bottom end to provide stable support to the power tool, and the second structural member converges towards the first structural member in a collapsed orientation of the stand whereby the second structural member top end is slid towards the first structural member top end and the second structural member pivots relative to the first structural member about the pivotal connection of the intermediate region whereby the second structural member bottom end is translated towards the first structural member bottom end for providing a compact collapsed stand that is utilized by a user for transporting the power tool and stand upon the pair of wheels.

24. A collapsible stand for a bench-top power tool, the stand comprising: PARA2a frame adapted to receive a bench-top power tool affixed thereon, the frame including a pair of generally longitudinal members having first and second ends and being interconnected by at least one transverse member, each of the pair of longitudinal members having a channel formed therein; PARA2a first structural member having a top end pivotally connected to a first end of the frame, an intermediate region and a bottom distal end defining at least one foot to rest on an underlying support surface; PARA2a pair of sliding members, each slidably received within the channel for limited longitudinal translation therealong; PARA2a second structural member having a top end pivotally connected to the pair of sliding members, an intermediate region pivotally connected to the first structural member intermediate region, and a bottom distal end defining at least one foot to rest on the underlying support surface; and PARA2a pair of wheels rotatably connected to the base proximate to the first end of the first structural member; PARA2wherein an expanded orientation of the stand is defined by the second structural member top end being spaced apart from the first structural member top end and the second structural member bottom end being spaced apart from the first structural member bottom end to provide stable support to the power tool, and the second structural member converges towards the first structural member in a collapsed orientation of the stand whereby the second structural member top end is slid towards the first structural member top end and the second structural member pivots relative to the first structural member about the pivotal connection of the intermediate region whereby the second structural member bottom end is translated towards the first structural member bottom end for providing a compact collapsed stand that is utilized by a user for transporting the power tool and stand upon the pair of wheels; and PARA2wherein the at least one transverse member has a slot formed therein that is sized to receive the second structural member in the collapsed orientation of the stand.

25. A collapsible stand for a bench-top power tool, the stand comprising: PARA2a frame adapted to receive a bench-top power tool affixed thereon, the frame including a pair of generally longitudinal members having first and second ends and being interconnected by at least one transverse member, each of the pair of longitudinal members having a channel formed therein; PARA2a first structural member defined by a pair of tubular legs oriented outboard of the frame, the first structural member having a top end pivotally connected to a first end of the frame, an intermediate region and a bottom distal end defining at least one foot to rest on an underlying support surface; PARA2a pair of sliding members, each slidably received within the channel for limited longitudinal translation therealong; PARA2a second structural member oriented inboard of the first structural member tubular legs, the second structural member having a top end pivotally connected to the pair of sliding members, an intermediate region pivotally connected to the first structural member intermediate region, and a bottom distal end defining at least one foot to rest on the underlying support surface; and PARA2a pair of wheels rotatably connected to the base proximate to the first end of the first structural member; PARA2wherein an expanded orientation of the stand is defined by the second structural member top end being spaced apart from the first structural member top end and the second structural member bottom end being spaced apart from the first structural member bottom end to provide stable support to the power tool, and the second structural member converges towards the first structural member in a collapsed orientation of the stand whereby the second structural member top end is slid towards the first structural member top end and the second structural member pivots relative to the first structural member about the pivotal connection of the intermediate region whereby the second structural member bottom end is translated towards the first structural member bottom end for providing a compact collapsed stand that is utilized by a user for transporting the power tool and stand upon the pair of wheels.

* * * * *

UNITED STATES PATENT AND TRADEMARK OFFICE

CERTIFICATE OF CORRECTION

PATENT NO. : 6,942,229 B2 
DATED : September 13, 2005
INVENTOR(S) : K.M. Brazell et al.

It is certified that error appears in the above-identified patent and that said Letters Patent is hereby corrected as shown below:

Column 8,
Line 20, delete "PARA2" and start a new paragraph with "a second".
Line 26, delete "PARA2" and start a new paragraph with "a locking mechanism".
Line 29, delete "PARA2" and start a new paragraph with "a pair of wheels".
Line 31, delete "PARA2" and start a new paragraph with "wherein an expanded".
Lines 59-60, delete "PARA2" and start a new paragraph with "a sliding member".

Column 9,
Line 23, delete "PARA2" and start a new paragraph with "a pair of sliding members,".
Line 25, delete "PARA2" and start a new paragraph with "wherein the first".
Line 47, delete "PARA2" and start a new paragraph with "wherein the second".
Line 48, delete "PARA2" and start a new paragraph with "wherein the frame".

Column 10,
Line 11, delete "PARA2" and start a new paragraph with "tilting the power".
Line 13, delete "PARA2" and start a new paragraph with "translating an upper".
Line 18, delete "PARA2" and start a new paragraph with "pivoting the slidable".
Line 20, delete "PARA2" and start a new paragraph with "latching one of the".
Line 22, delete "PARA2" and start a new paragraph with "resting the power".
Line 24, delete "PARA2" and start a new paragraph with "unlatching the slidable".
Line 26, delete "PARA2" and start a new paragraph with "pivoting".
Line 29, delete "PARA2" and start a new paragraph with "translating the".
Line 33, delete "PARA2" and start a new paragraph with "latching one".
Line 36, delete "PARA2" and start a new paragraph with "a power tool".
Line 38, delete "PARA2" and start a new paragraph with "a rectangular frame".
Line 43, delete "PARA2" and start a new paragraph with "a sliding".
Line 44, delete "PARA2" and start a new paragraph with "a first pair".
Line 49, delete "PARA2" and start a new paragraph with "a second pair".
Line 53, delete "PARA2" and start a new paragraph with "a latching".
Line 56, delete "PARA2" and start a new paragraph with "a pair of wheels".
Line 58, delete "PARA2" and start a new paragraph with "wherein an expanded".

UNITED STATES PATENT AND TRADEMARK OFFICE

CERTIFICATE OF CORRECTION

PATENT NO. : 6,942,229 B2
DATED : September 13, 2005
INVENTOR(S) : K.M. Brazell et al.

It is certified that error appears in the above-identified patent and that said Letters Patent is hereby corrected as shown below:

Column 11,
Line 4, delete “PARA2” and start a new paragraph with “a first structural”.
Line 8, delete “PARA2” and start a new paragraph with “a second”.
Line 14, delete “PARA2” and start a new paragraph with “a pair of wheels”.
Line 16, delete “PARA2” and start a new paragraph with “at least one”.
Line 22, delete “PARA2” and start a new paragraph with “wherein an expanded”.
Line 41, delete “PARA2” and start a new paragraph with “a frame adapted”.
Line 46, delete “PARA2” and start a new paragraph with “a first structural”.
Line 50, delete “PARA2” and start a new paragraph with “a pair of sliding”.
Line 52, delete “PARA2” and start a new paragraph with “a second structural”.
Line 57, delete “PARA2” and start a new paragraph with “a pair of wheels”.
Line 59, delete “PARA2” and start a new paragraph with “wherein an expanded”.

Column 12,
Line 15, delete “PARA2” and start a new paragraph with “wherein the at least”.
Line 20, delete “PARA2” and start a new paragraph with “a frame adapted”.
Line 25, delete “PARA2” and start a new paragraph with “a first structural”.
Line 30, delete “PARA2” and start a new paragraph with “a pair of”.
Lines 32-33, delete “PARA2” and start a new paragraph with “second structural member”.
Line 39, delete “PARA2” and start a new paragraph with “a pair of wheels”.
Line 41, delete “PARA2” and start a new paragraph with “wherein an expanded”.

Signed and Sealed this

Twenty-eighth Day of February, 2006

JON W. DUDAS
*Director of the United States Patent and Trademark Office*